United States Patent Office 3,385,903
Patented May 28, 1968

3,385,903
PRODUCTION OF TRIMETHYLPHENOLS
David Bruce Bright, Oakland, Walter V. Turner, Jr., Berkeley, and Ellis R. White, Oakland, Calif., assignors to Shell Oil Company, New York, N.Y., a corporation of Delaware
No Drawing. Filed Nov. 25, 1966, Ser. No. 596,808
6 Claims. (Cl. 260—621)

ABSTRACT OF THE DISCLOSURE

Trimethylphenols, particularly 3,4,5- and 2,3,5-trimethylphenol, are prepared by heating 2-chloroisophorone with an aqueous mineral acid solution at autogenous pressure. The phenols are especially useful as germicidal materials and for conversion into soil insecticidal materials.

---

This invention relates to an improved process for the production of trimethylphenols, and more particularly to the production of 3,4,5- and 2,3,5-trimethylphenol.

PRIOR ART

F. M. Beringer and E. J. Geering, J. Am. Chem. Soc., 75, 2633 (1953), demonstrate a number of methods of obtaining 2,3,5- and 3,4,5-trimethylphenol from isophorone. Their most successful method comprised brominating isophorone in 1,2,4-trichlorobenzene (B.P. 213° C.) and refluxing the resulting solution until the evolution of hydrogen bromide ceased to obtain a 44–47% yield of a mixture of 2,3,5-trimethylphenol and 3,4,5-trimethylphenol in a ratio of about 1:3. Similarly, chlorination gave only 4% of these phenols. E. M. Kosower and G. S. Wu, J. Org. Chem., 28, 633 (1963), have heated isophorone with copper (II) chloride in the presence of lithium chloride and dimethylformamide to obtain equal quantities of 3-chloromethyl-5,5-dimethyl-2-cyclohexen-1-one and 6-chloro-3,5,5-trimethyl-2-cyclohexen-1-one together with about 10% of a mixture of phenols comprising 6-chloro-2,3,5-trimethylphenol; 2,3,5-trimethylphenol; and 2-chloro-3,4,5-trimethylphenol. W. von Doering and F. M. Beringer, J. Am. Chem. Soc., 71, 2221 (1949), disclose that treatment of isophorone with a large excess of 30% oleum at ambient temperature for ten days followed by exhaustive steam distillation results in the formation of 3,4,5-trimethylphenol in 54% yield. The two disadvantages of this method are the low yield and the long time per unit output required for reaction and hydrolysis of the intermediate sulfonated phenol. It is readily apparent that an economical and commercialy feasible route to trimethylphenols, particularly 3,4,5- and 2,3,5-trimethylphenol, which are useful germicidal materials, is not available by the above-described methods.

THE INVENTION

A commercially feasible process has now been found for the production of high yields of 3,4,5-trimethylphenol in major amount in admixture with 2,3,5-trimethylphenol in minor amount, which consists essentially of treating 2-chloroisophorone with an aqueous solution of mineral acid, preferably hydrochloric acid, of normality of from about 1 to 15 at a temperature in the range of about 100 to about 180° C. and at autogeneous pressure.

REACTANTS 2-chloroisophorone, the desired starting material in the process of the invention, can be obtained by the direct chlorination of isophorone. Isophorone is chlorinated readily at temperatures as low as $-20°$ C. to yield 2-chloroisophorone. Using about 90% of the theoretical requirement of chlorine at temperatures of about 20° C., 2-chloroisophorone is obtained in yields of about 80% based on isophorone consumed or in yields of abut 70% based on chlorine. The yield is dependent on conversion of isophorone, in general higher yield being obtained from lower conversion. For example, using 50% of the theoretical requirement of chlorine at about 20° C., a conversion of 44% of isophorone is obtained with 88% yield of 2-chloroisophorone. The reaction also produces one mole of hydrogen chloride, which at room temperature, remains dissolved in the mixture. Pure 2-chloroisophorone can be recovered therefrom, preferably after a water wash, by distillation at reduced pressures, preferably at about 5 mm. Hg or less; distillation at higher pressures, i.e. higher temperatures, can lead to reduced yields from product decomposition.

In the process of the invention, 2-chloroisophorone is treated with aqueous mineral acid solution. By mineral acids is meant strong inorganic acids, i.e. hydrochloric, hydrobromic, sulfuric, phosphoric, and nitric. The mineral acid most preferred for use in this process is hydrochloric acid. Nitric acid, though usable, is the least preferred since it may effect some substitution of the phenolic ring and/or will undergo some decomposition upon contact with hydrochloric acid, which is formed in situ regardless of the mineral acid started with.

REACTION CONDITIONS

The production of improved yields of 3,4,5-trimethylphenol in admixture with 2,3,5-trimethylphenol is accomplished by treating 2-chloroisophorone with aqueous mineral acid at a temperature in the range of about 100 to about 180° C. and preferably in the range of about 130 to about 150° C. The process is preferably carried out in a closed vessel and is thereby operated at autogenous, i.e. elevated, pressure. Lower temperatures may be used but are not practical due to the required increase in reaction time. Higher temperatures are to be avoided because of the ease with which the desired phenolic products are heat-degraded, resulting in loss of yield. It is possible to heat 2-chloroisophorone at temperatures above 180° C. in the absence of aqueous mineral acid to obtain some trimethylphenol; however, the yields of desired product are low and are accompanied by formation of a quantity of tar.

The concentration of the aqueous mineral acid required for the conversion of 2-chloroisophorone to trimethylphenol is in the range of from about 1 N to about 15 N. Intermolecular methyl migration during the conversion produces a small quantity of tetramethylcyclohexanone impurity. This migration is favored in milder acidic media; for example the impurity is about 2% of yield at acid strength of 3 N and about 7% at 1 N acidity. Hence, a preferred range comprises from about 3 N to about 12 N. Since normality depends upon relative volumes of the reagents, these may be adjusted to keep normality within these ranges, particularly when operating continuously as described hereinbelow. When operating batchwise, it is convenient to initiate the process at a normality in the lower range, for example from 3 N to 6 N, and permit the in situ formed acid to be retained, thereby increasing the acidity of the reaction mixture.

Upon treatment with the above-described hot (100–180° C.) aqueous acid, 2-chloroisophorone loses a mole of HCl and rearranges to give mixtures in the ratio of about 70–90% by mole of 3,4,5-trimethylphenol to about 30–10% by mole of 2,3,5-trimethylphenol. In the process of the invention, particularly when utilizing hydrochloric acid, yields of the mixture of these two phenols in excess of 95%, based on pure 2-chloroisophorone starting material, are obtained.

In one modification of the process, the mole of hydrochloric acid obtained as by-product in the chlorination of isophorone may be retained in the former 2-chloroisophorone, accompanied by the addition of water to produce the aqueous acid medium. Upon heating the resulting mixture, additional HCl is released in the conversion of 2-chloroisophorone to trimethylphenol, thereby obtaining total acids of the required strength. A more preferred modification resulting in better yields of subsequent trimethylphenol products comprises purifying, e.g. by distillation, the 2-chloroisophorone obtained from the chlorination of isophorone, followed by addition of aqueous acid and the required heating.

The process also may be operated in a continuous manner. In one modification of the process a stream of distilled 2-chloroisophrone and an aqueous acid stream, which is ultimately a recirculating acid stream, are pumped to the top of a rotating disc contactor (see G. T. Reman, U.S. 2,601,674, June 24, 1952) made of corrosion-resistant material or to a glass-lined steel tower packed with ceramic rings. After proper resistance time, a single stream is removed from the bottom and led to a phase separator wherein the organic phase containing the desired phenolic product separates from the aqueous acid phase. The aqueous aicd is removed and pumped for recirculation to the initial reactor via a heat exchanger unit. Since acid is a by-product of the process, bleeding of this line to reduce and/or maintain desired acid strength followed by any necessary addition of water is provided. It may be desirable to operate at moderate acid concentrations to reduce corrosion problems inherent in the use of very strongly acidic media. The organic phase removed from the phase separator is washed with water and then distilled, e.g. by flashing, to remove small amounts of tar impurity to yield the desired mixture of 3,4,5- and 2,3,5-trimethylphenol. Alternatively, in place of the tower arrangement, multistage glass-lined vessels equipped with corrosion-resistant stirring means may be employed for continuous operation, the first vessel of the series being fed by the 2-chloroisophorone and acid streams and the last vessel of the series leading to the phase separator.

UTILITY

J. G. Kuderna, Jr., and D. D. Phillips, U.S. Patent 3,130,122, Apr. 21, 1964, disclose the preparation of 3,4,5-trimethylphenyl methylcarbamate by reacting 3,4,5-trimethylphenol with methyl isocyanate in the presence of a catalytic amount of a catalyst such as a tertiary aliphatic amine; the patent indicates that this carbamate is an effective insecticide for controlling soil-dwelling insect pests. The present invention provides the 3,4,5-trimethylphenol precursor for the above-mentioned carbamate. It has been found that a surprisingly effective insecticide for controlling soil-dwelling insects is the mixture of 3,4,5-trimethylphenyl methylcarbamate and 2,3,5-trimethylphenyl methylcarbamate, prepared by reacting the 3,4,5-trimethylphenol in admixture with 2,3,5-trimethylphenol, provided directly by the process of the present invention, with methyl isocyanate at about 40–45° C. in an inert solvent and in the presence of a catalytic amount of trimethylamine.

Example 1

A 500-ml., 3-neck, round-bottom flask was equipped with an air-driven stirrer, a sintered-glass gas inlet tube, and a thermometer suspended through the third neck. In the flask was placed 100.97 grams (0.732 mole) of isophorone. Over a 45-minute period, 47 grams (0.666 mole or 91% of theory) of chlorine was bubbled in while the temperature was maintained at 13–19° C. by an ice bath. After the addition of the chlorine, the product was analyzed by gas-liquid chromatography (GLC). The mixture contained 23.6 %by weight of isophorone, 73.3% by weight of 2-chloroisophorone, and 3.1% by weight of higher boiling products. This is, assuming the higher boiling component to be a dichlorinated compound, a conversion of 72.0%.

To the mixture was added 20 ml. of hexane and 100 ml. of water. The water was titrated for acid. The number of moles of acid found equaled exactly the number of moles of chlorine added. The organic layer, after storage for three days at −11° C., was washed again with 100 ml. of water, then distilled at 0.1 mm. Hg, using a 15-inch column packed with glass helices.

The first fraction, boiling at 33–45° C., contained 23.4 g. of isophorone, which represented a recovery of 23%. The second fraction, counting the liquid found in the column after the first fraction, contained 67.9 grams of 88% 2-chloroisophorone. (This was a simple flash-over distillation, the column having been removed after the first fraction.) This fraction also contained 4% isophorone, 6% of what was taken as an isomeric monochloroisophorone, and 1.6% of the higher boiling component.

The yield of 2-chloroisophorone based on chlorine was 70%. Based on isophorone consumed, it was 82.4%.

Example 2

A 6-ounce Fischer-Porter pressure bottle was given a Hastelloy B closure and valve. Into it were put 20.00 grams (0.116 mole) of pure 2-chloroisophorone, 40 ml. of 3 N HCl (0.12 mole HCl), and a magnetic stirring bar. The bottle was sealed and heated for 17 hours in an oil bath at 140–143° C. while the contents were stirred vigorously.

On cooling, the brown organic layer crystallized. It was washed out with water, ground up, and dried in the air for several hours. It had a constant weight of 15.33 grams. By GLC this was identified as 79.5% of 3,4,5-trimethylphenol, 19.1% of 2,3,5-trimethylphenol, and 1.4% of a lower boiling component.

Extraction of the HCl layer and the wash water with 200 ml. ether gave 0.30 gram of slightly tacky crystals. By GLC this was identified at 46% of 3,4,5-trimethylphenol, 27% of 2,3,5-trimethylphenol, and 27% of the low-boiling component.

The first crop represented 97.2% of the theoretical yield of phenols. With the second crop, the yield became 99%. The selectivity to 3,4,5-trimethylphenol was 79%. Chemical analysis of the first crop showed 0.1% or less chlorine and 0.72 eq./100 g. of phenolic acidity. Theoretical acidity is 0.735 eq./100 g.

The first crop was recrystallized from about 5 ml. hexane per gram to give 96.5% recovery of 3,4,5-trimethylphenol in admixture with 12% of 2,3,5-trimethylphenol.

Similarly, when 2-chloroisophorone (0.5 mole) was treated with 12.4 N sulfuric acid (100 g. of 45% $H_2SO_4$–55% $H_2O$) at 130° C. for 24 hours, a mixture of phenols containing 89.4% of 3,4,5-trimethylphenol and 10.6% of 2,3,5-trimethylphenol was obtained in good yield.

Example 3

Following the method described in Example 2 while varying reaction conditions produced the results summarized in Table I below.

TBLE 1.—CONVERSION OF 2-CHLOROISOPHORONE TO TRIMETHYLPHENOLS

| Reagent | Time, hrs. | Temperature, °C. | Conversion, Percent | Yield of Phenols, Percent [1] | Relative Amount of Trimethylphenols, percent | |
|---|---|---|---|---|---|---|
| | | | | | 3,4,5- | 2,3,5- |
| 40 ml., 6 N HCl | 72 | 96-109 | 89.4 | 92 | 85 | 15 |
| 40 ml., 3 N HCl | 16 | 130-137 | 94-96 | 96 | 85 | 15 |
| 40 ml., 3 N HCl | 17 | 139-143 | 100 | 98.7 | 80.7 | 19.2 |
| 40 ml., N HCl [2] | 16 | 133-136 | 99 | 77 | 79 | 21 |

[1] Percent of theoretical based on 2-chloroisophorone consumed.
[2] Starting with 20 g. of crude, freshly chlorinated isophorone from which unreacted isophorone had been distilled.

We claim as our invention:

1. The process for producing 3,4,5-trimethylphenol in substantially major amount in admixture with 2,3,5-trimethylphenol in minor amount by heating at a temperature in the range of about 100 to about 180° C. and at autogeneous pressure 2-chloroisophorone in the presence of an aqueous solution of mineral acid of normality of from about 1 to 15.

2. The process in accordance with claim 1 wherein the acid strength is from about 3 N to about 12 N.

3. The process in accordance with claim 1 wherein the temperature is in the range of about 130 to about 150° C.

4. The process in accordance with claim 1 wherein the mineral acid is hydrochloric acid.

5. The process in accordance with claim 1 wherein the mineral acid in sulfuric acid.

6. The process in accordance with claim 1 wherein the mixture of trimethylphenols produced consists essentially of about 70–90% by mole of 3,4,5-trimethylphenol and about 30–10% by mole of 2,3,5-trimethylphenol.

No references cited.

BERNARD HELFIN, *Acting Primary Examiner.*

H. ROBERTS, *Assistant Examiner.*